United States Patent [19]

Shaw et al.

[11] Patent Number: 4,637,467

[45] Date of Patent: Jan. 20, 1987

[54] PERMEABILITY CONTRAST CORRECTION

[75] Inventors: James E. Shaw; John Westerman, both of Bartlesville, Okla.

[73] Assignee: Phillips Petroleum Company, Bartlesville, Okla.

[21] Appl. No.: 755,750

[22] Filed: Jul. 17, 1985

[51] Int. Cl.⁴ .................. E21B 33/13; E21B 43/22
[52] U.S. Cl. ................................. 166/295; 166/294
[58] Field of Search .................. 166/292–295, 166/270, 300, 274; 252/8.55 R

[56] References Cited

U.S. PATENT DOCUMENTS

| | | | |
|---|---|---|---|
| 3,115,930 | 12/1963 | Bernard | 166/33 |
| 3,152,641 | 10/1964 | Boyd | 166/33 |
| 3,199,588 | 8/1965 | Holbert | 166/33 |
| 3,199,589 | 8/1965 | Boyd et al. | 166/33 |
| 3,277,056 | 10/1966 | Coleman | 260/63 |
| 3,451,480 | 6/1969 | Zeh et al. | 166/308 |
| 3,476,186 | 11/1969 | Sarem | 166/274 |
| 3,542,867 | 11/1970 | Foecking | 260/561 |
| 3,542,875 | 11/1970 | Raymond | 260/561 |
| 3,551,384 | 12/1970 | Zeh | 260/63 |
| 3,900,069 | 8/1975 | Sarem | 166/274 |
| 3,948,783 | 4/1976 | Szabo et al. | 166/274 |
| 4,031,958 | 6/1977 | Sandiford et al. | 166/270 |
| 4,070,865 | 1/1978 | McLaughlin | 61/36 C |
| 4,141,416 | 2/1979 | Holm | 166/270 |
| 4,190,109 | 2/1980 | Barton, Jr. | 166/270 |
| 4,359,093 | 11/1982 | Bernard | 166/274 |

*Primary Examiner*—Stephen J. Novosad
*Assistant Examiner*—Bruce M. Kisliuk
*Attorney, Agent, or Firm*—A. W. Umphlett

[57] ABSTRACT

Polymerization in-situ to effect permeability contrast correction in oil-bearing subterranean formations comprising the injection of at least one water-soluble monomer comprising N-3-oxohydrocarbon-substituted acrylamides, such as diacetone acrylamide, and optionally at least one water-soluble comonomer, such as alpha,beta-unsaturated amides, alpha,beta-unsaturated nitriles, vinyl-containing sulfonates and N-vinyl amides and polymerization initiator to cause polymerization and formation of water-insoluble polymers in high permeability zones.

18 Claims, No Drawings

PERMEABILITY CONTRAST CORRECTION

This invention relates generally to the recovery of oil from subterranean oil-bearing formations. In one aspect it relates to a method for polymerizing water-soluble monomers to water-insoluble polymers in a subterranean formation. In accordance with a further aspect, this invention relates to a process for the selective plugging of permeable subterranean strata by in situ polymerization of water-soluble monomers that are polymerized to water-insoluble polymers. In still another aspect, this invention relates to a method for correcting the water permeability of subterranean formations. In still another aspect, this invention relates to a method for reducing the permeability of subterranean formations, thereby promoting better control of fluid injection patterns and improving the enhanced recovery of hydrocarbons.

BACKGROUND OF THE INVENTION

In post-primary oil recovery operations, recovery of oil is maximized if the driven fluid is permitted to build up in a wide bank in front of the driving fluid which moves uniformly toward a producing well. To keep this bank of oil intact while moving toward a producing well, a substantially uniform permeability must exist throughout the strata. If this uniform permeability does not exist, and it generally does not, the flooding fluids will seek the areas of high permeability and channeling occurs with the appearance of excess driving fluid at the producing well. Moreover, as the more permeable strata are depleted of oils, the driving fluid has a tendency to follow these channels and further increase water production as reflected in an increased water-to-oil ratio at producing wells to the point that the process becomes economically undesirable.

It is known in the art that more uniform flood fronts can be obtained in formations of non-uniform permeability by mobility control or permeability contrast correction of the more permeable strata in the formation. A number of methods for reducing the permeability of these permeable strata have been proposed, including the injection of plugging materials into the strata which at least partially plug the permeable zones so as to achieve more uniform permeability. Some of these methods of permeability contrast correction accomplish the plugging step by the in situ formation of plugging material in the formation by the injection of one or more reaction substances which chemically react to form a solid residue. The present invention is directed to the in situ formation of water-insoluble polymers from water-soluble monomers in a manner such that selective plugging of the formation is achieved.

Accordingly, an object of this invention is to provide an improved process for the recovery of oil from subterranean oil-bearing formations.

Another object of this invention is to selectively plug high permeability zones in subterranean formations.

Another object of this invention is to increase sweep efficiency of post-primary or enhanced oil recovery operations.

Other aspects, objects and the several advantages of this invention will become readily apparent to those skilled in the art from a reading of the following detailed description of the invention and the appended claims.

SUMMARY OF THE INVENTION

In accordance with the invention, it has been found that high permeability strata in subterranean formations can be selectively plugged by in situ polymerization of water-soluble monomers to form water-insoluble polymers to effectively minimize channeling of injected fluid, into high permeability strata.

In accordance with one embodiment of this invention, it has been found that water-insoluble diacetone acrylamide (DAAM) homopolymer and selected water-insoluble copolymers of DAAM formed by in situ polymerization in high permeability strata in subterranean formations are effective for permeability contrast correction.

In accordance with a specific embodiment of this invention, permeability contrast correction operations involve the in situ polymerization of water-soluble monomers, such as acrylamide (Am), and diacetone acrylamide (DAAm) to form water-insoluble polymers. Copolymers containing on the order of 40 to 95 weight percent diacetone acrylamide and at least one other water-soluble monomer such as acrylamide and N-vinyl-2-pyrrolidone (VP) are water insoluble and are, therefore, suitable for use in the instant process. In this application, water-soluble monomers exhibit a water solubility of not less than 5 g of monomer per 100 mL of water 20° C.

DETAILED DESCRIPTION OF THE INVENTION

The invention is applicable to any situation where it is desired to selectively plug the more permeable zones in subterranean formations. Primarily, the invention is directed to selective plugging of more permeable zones known as "thief" zones to improve the sweep efficiency of post-primary or enhanced oil recovery processes.

The plug forming materials of this invention are generated in situ from water-soluble monomers that upon polymerization form water-insoluble polymers. Accordingly, the invention involves injecting into subterranean formations water-soluble monomers and at least one polymerization initiator and carrying out polymerization of the injected water-soluble monomers in the formation under conditions to form insoluble polymers which plug the more permeable portions of the formation.

POLYMERS

As used herein, the term "polymers" is used generically unless otherwise indicated to mean homopolymers and copolymers prepared from water-soluble monomers wherein a major portion of the monomer(s) is an N-3-oxohydrocarbon-substituted arylamide, preferably diacetone acrylamide (DAAm), viz., N-3-oxo-1,1-dimethyl-butyl acrylamide.

Homopolymers of N-3-oxohydrocarbon-substituted acrylamides prepared in accordance with this invention are water-insoluble and maintain their properties even under adverse conditions such as high temperature, high salinity and/or high concentrations of "hardness" ions.

Homopolymers of this invention are derived from monomer units of N-3-oxohydrocarbon-substituted acrylamides having the structural formula

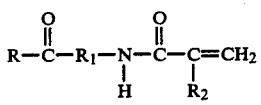

wherein R and $R_2$ are each selected from the class consisting of hydrogen and lower alkyl radicals and $R_1$ is selected from the class consisting of ethylene and lower alkyl-substituted ethylene radicals. The lower alkyl radicals are those containing no more than about 6 carbon atoms with the proviso that the monomers contain 6 to 14 carbon atoms. Radicals are exemplified by methyl, ethyl, propyl, isopropyl, butyl, sec-butyl, n-pentyl, cyclohexyl and cyclopentyl radicals.

The N-3-oxohydrocarbon-substituted acrylamide monomers and polymers are disclosed in U.S. Pat. No. 3,277,056 which is incorporated herein by reference.

Specific examples of the N-3-oxohydrocarbon-substituted acrylamides include
N-3-oxopropyl acrylamide,
N-3-oxobutyl acrylamide,
N-3-oxo-1-methyl-butyl acrylamide,
N-3-oxo-1,1-dimethyl-butyl acrylamide,
N-3-oxo-1,2-dimethyl-1-ethyl-butyl acrylamide,
N-3-oxo-1,5-dimethyl-1-isopropyl-hexyl acrylamide,
and N-3-oxo-1-methyl-butyl alpha-methyl acrylamide, The diacetone acrylamide (DAAm) copolymers of this invention are produced by copolymerizing a major proportion of at least one N-3-oxohydrocarbon-substituted acrylamide with a minor amount of at least one comonomer selected from N-vinyl amides having the formula

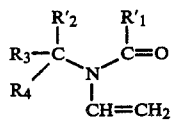

wherein $R'_2$, $R_3$ and $R_4$ are selected independently from the group consisting of hydrogen and methyl and $R_1$ is selected from $C_1$ to $C_3$ alkyl groups. The groups $R'_1$, and $R'_2$ can collectively represent linear or branched divalent alkylene groups containing 2 to 4 carbon atoms. These monomers are generally water-soluble or water-dispersible.

A more preferred class of compounds are those of the formula

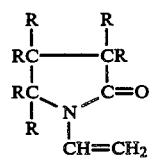

wherein R is hydrogen, methyl or ethyl. The monomer unit presently most preferred is N-vinyl-2-pyrrolidone.
The water insoluble copolymers of this invention can

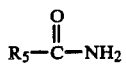

wherein $R_5$ is a 1-alkenyl radical selected from the group ethenyl(vinyl), 1-propenyl, 2-propenyl, 1-butenyl, 2-methyl-1-propenyl, 1-pentenyl, 3-methyl-1-butenyl, and 1-methyl-1-butenyl. These alpha,beta-unsaturated amides are generally water-soluble or water-dispersible.

The comonomers presently preferred for polymerization with diacetone acrylamide (DAAm) are N-vinyl-2-pyrrolidone (VP) and acrylamide (Am). For convenience, the terms VP and Am will be used to refer to these comonomers, respectively, in the discussions herein.

A more preferred class of alpha,beta-unsaturated amide comonomers for polymerization with diacetone acrylamide is described by the formula

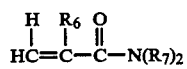

wherein each $R_6$ is individually selected from H and methyl. Especially suitable in addition to acrylamide are N-methylacrylamide and N,N-dimethylacrylamide (DMAm).

Another class of comonomers that can be used for polymerization with diacetone acrylamide includes alpha-beta-unsaturated nitriles, e.g., acrylonitrile, methacrylonitrile and the like.

Diacetone acrylamides can also be polymerized with a minor amount of another comonomer referred to as a vinyl-containing sulfonate which is meant to encompass the acid also. They are represented by the following formula

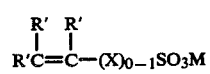

wherein R' is methyl, ethyl or H preferably methyl or H and provided further that at least one of the R' groups on the terminal carbon of the vinyl group is H and the other is H or methyl; M is H, $Na^+$, $K^+$, $Li^+$, $R''_4N^+$, $Ca^{++}$ or $Mg^{++}$ and X is

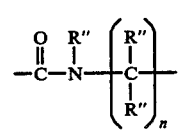

wherein n is an integer of 1–5 preferably 1–3 and R'' is a 1-3 carbon atom alkyl group or H. Examples of suitable monomers include:

$H_2C=CH-SO_3NA$ vinyl sulfonate, sodium salt

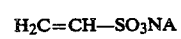

sodium 2-acrylamido-2-methylpropanesulfonate (NaAMPS)

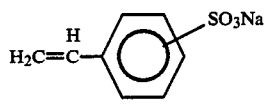

styrene sulfonate, sodium salt

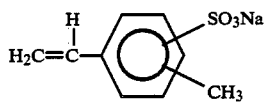

sodium vinyl toluene sulfonate

sodium p-vinylbenzyl sulfonate

These are known monomers and can be produced as is known in the art. Particularly with regard to the N-sulfohydrocarbon-substituted acrylamides, they are disclosed in U.S. Pat. No. 3,679,000 assigned to the Lubrizol Corporation, the disclosure of which patent is incorporated by reference. The 2-acrylamido-2-methylpropane sulfonic acid is available from Lubrizol under the designation AMPS.

The relative proportions of the water-soluble diacetone acrylamide monomer and the water-soluble comonomers that can be used depend upon the reactivity of these monomers as well as the desired properties of the resulting water-insoluble polymers. It has been found, however, that the amount of diacetone acrylamide present in the copolymers ranges from about 40 to about 95 weight percent of the polymer composition. Thus, broadly, the water-insoluble polymers of the invention comprise a major amount of at least one N-3-oxohydrocarbon-substituted acrylamide and preferably from about 60 to 100 weight percent diacetone acrylamide (DAAm) with the balance in copolymers being formed from at least one other water-soluble monomer.

POLYMERIZATION

The polymers of this invention can be formd in situ by injecting monomer solutions containing polymerization initiators into subterranean formations. The feasibility of polymerizing the monomers in situ, e.g., in saline connate waters is supported by the success of laboratory runs in Berea sandstone cores wherein the cores were plugged by injecting solutions of monomers and initiators. The cores were saturated with brine containing appropriate dissolved salts, such as found in sea water, to provide a simulated or synthetic sea water (SSW). Natural sea water and formation brines can also be used as the polymerization media in the core runs. Various field brines containing a high percentage of dissolved solids can be diluted with fresh water to provide an appropriate concentration of dissolved solids for lab core tests. Alternatively, salts can be added to various field brines, if deemed necessary, to obtain the desired salt level.

The following summary indicates rperesentative monomer charges and initiators which are useful over a range of temperatures for permeability contrast correction as described in the instant invention.

| Monomer Charge | Reservoir Temp. °F. | Initiator |
|---|---|---|
| 60–80 pts by wt DAAm 40–20 pts by wt Am | 75–125 | Amidino-type such as Wako-VA-044 and Wako V-50 and persulfates with or without added activators |
| 60–80 pts by wt DAAm 40–20 pts by wt Am | 125–175 | Wako V-50, AIBN and azocyanovaleric acids |
| 79–90 pts by wt DAAm 30–10 pts by wt Am | 175–200 | Wako V-50, AIBN and azocyanovaleric acids |
| 80–95 pts by wt DAAm 20–5 pts by wt NaAMPS | 175–200 | Wako V-50, AIBN and azocyanovaleric acids |
| 80–95 pts by wt DAAm 20–5 pts by wt NaAMPS | >200 | azocyanovaleric acids |
| 40–80 pts by wt DAAm 60–20 pts by wt VP | >200 | azocyanovaleric acids |

Oil field brines can be used as polymerization media in lab core runs. Such brines can be filtered or otherwise purified to remove undesirable solid matter before use in lab runs. Oil field brines can contain up to about 25 percent by weight of dissolved inorganic salts. In addition to NaCl, brines usually contain up to about 10 percent by weight of $Ca^{++}$ and $Mg^{++}$ based on the total amount of salts present. Small amounts of other soluble salts are also frequently present, e.g., $NaHCO_3$, $BaCl_2$, and the like. Typical brines contain from about 1 to about 14 weight percent dissolved salts based on water.

If the in situ polymerization is to be carried out at an offshore oil recovery site, natural sea water would be the preferred polymerization medium to use in simulated lab core runs. Sea water may require a preliminary treatment such as simple filtration to render it suitable for use as a polymerization medium in a laboratory core test.

POLYMERIZATION INITIATORS

The polymers of this invention can be prepared by processes using various free radical polymerization initiators known to those skilled in the art. Preferred initiators for the instant invention include chemical polymerization initiators.

Chemical polymerization initiators suitable for the inventive in situ polymerization process include azo compounds and organic peroxides such as 2,2'-azobis(isobutyronitrile) (commercially available as Vazo-64 ® from E. I. DuPont); 2-t-butylazo-2-cyanopropane, 2,2'-azobis(2,4-dimethylvaleronitrile) (Vazo-52 ® from E. I. DuPont), 2,2'azobis(2-amidinopropane)dihydrochloride (V-50 from Wako); 2-t-butylazo-2-cyanobutane; 2-t-butylazo-1-cyanocyclohexane; benzoyl peroxide; di-t-butyl peroxide; 2,2'-azobis(N,N-dimethyleneisobutyramidine)dihydrochloride(VA-044 from Wako); t-butylperoxy-acetate, t-butyl peroxypivalate, 2-t-butylazo-2-cyano-4-methoxy-4-methylpentane (commercially available as Luazo ®55 from Lucidol Div., Pennwalt Corp.); and hyponitrites such as t-butyl hyponitrite and t-amyl hyponitrite; 2-t-butylazo-2-cyano-4-methylpentane (Luazo ®70); 4,4'-azobis(4-cyanovaleric acid); 4-t-butylazo-4-cyanovaleric acid and the like. The azo compounds are presently preferred for most applications, as some peroxides appear to have a tendency to adversely affect the polymer; however, some peroxides are effective at lower temperatures than those at which most azo compounds are useful.

A particularly suitable lower temperature initiator is 2,2'-azobis(2,4-dimethyl-4-methoxy-valeronitrile) commercially available as Vazo 33 from E. I. DuPont. Presently preferred initiators include t-butyl peroxypivalate (t-BPP), Luazo 55, Luazo 70, p-menthane hydroperoxide activated by $FeSO_4.7H_2O$ and especially 2,2'-azobis-(isobutyronitrile) (AIBN). The use of these initiators usually results in the production of higher molecular weight polymers, Luazo 70 has been found to give excellent results because, as a liquid, it is more uniformly dispersible in water than are solid initiators such as AIBN. Luazo 55 is also a liquid and possesses the same advantage. The amidine type initiators and the 4-cyanovaleric acid initiators are preferred because they are water soluble. An inert atmosphere substantially free of oxygen or other known inhibiting materials should be provided when chemical polymerization initiators are used.

Chemical polymerization initiators which are substantially soluble in the polymerization media of this invention are advantageously used because they can be dissolved in the monomer solution or dispersed in a small amount of solvent which is miscible or soluble in the monomer solution therein before the monomer solution is injected into the subterranean formation.

Chemical polymerization initiators which are insufficiently soluble in the monomer solution of this invention in the concentration required for initiation can be added in the commercially available state or dispersed as a fine powder but are generally more effectively employed if first dissolved in a liquid which is soluble in or miscible with the monomer mixture. For example, a water-miscible solvent such as acetone or an alcohol can be used to solubilize 2,2'-azobis(isobutyronitrile), the preferred chemical initiator, and to disperse it in the aqueous monomer mixture.

Normally, about 0.05 to about 2 weight percent of chemical initiator based on total monomer weight is used for chemical initiation. The appropriate initiator is selected based on the temperature of the subterranean formation to be treated. For example, at a formation temperature of about 170 F., the initiator should have a half-life of at least several hours at 120 F.

The in situ polymerization of this invention is applicable to any situation where it is desired to selectively plug more permeable zones in subterranean formations by in situ polymerization of water-soluble monomers to form water-insoluble polymers. The invention is primarily directed to the selective plugging of the more permeable zones known as "thief" zones to improve the sweep efficiency of post-primary oil recovery processes. In accordance with the invention, one or more water-soluble monomers are injected as an aqueous slug into a subterranean formation passing predominantly into the more permeable zones of the formation wherein the monomers polymerize in situ and form water-insoluble polymers. Polymerization initiators can be injected preferably along with monomer(s). Alternatively, the initiators can be injected subsequently or prior to monomer injection.

Following injection of monomer or monomers and whatever induction time is required for in situ polymerization and plugging to occur, normal post-primary or enhanced oil recovery operations are then employed. For instance, conventional waterflooding can be commenced after a selective plugging operation is complete. With the more permeable zones selectively plugged, the subsequently injected drive fluids are diverted into the previously less permeable but relatively oil rich zones resulting in improved sweep efficiency and a lower water to oil ratio at the producing wells.

EXAMPLE I

This example describes the experimental procedure which was used to substantiate operability in the present invention.

Epoxy wrapped Berea sandstone cores (1" diameter × 3 inches long) which were equipped with pressure taps 1 centimeter from the face were evacuated, saturated and then pressure saturated with synthetic North Sea water (SNSW). The Berea cores were waterflooded at 150 F., with SNSW until a constant permeability was obtained. In one run (run 3, Table I), the core was oilflooded with crude NBU oil before waterflooding to residual oil saturation. The cores were generally conditioned in this manner before the injection of the monomer slugs containing polymerization initiators.

Two pore volume slugs of monomer/initiator were prepared for each core run. These solutions were purged with $N_2$ for 20–30 minutes before being injected into the cores. After injection of the monomer slugs, the cores were allowed to stand without flow overnight (ca. 18 hours) at 150 F. during which time the in-situ polymerization occurred.

After checking the entrance and exit tubing of the cores to verify that they were not blocked, the pumping of SNSW was resumed at the same rate as had been used before the in-situ polymerization. A rapid rise in injection pressure and an increase in resistance factor signaled the success of the in-situ polymerization. In order to demonstrate the permanence or lack thereof concerning the effectiveness of the instant process, the passage of SNSW into the cores was continued and resistance factors and permeabilities were monitored.

In general, the effectiveness of the instant process can be expected to be greater for water soluble monomer(s) systems resulting in the production of insoluble polymers.

EXAMPLE II

This example describes the results of selected Berea sandstone core runs in which in-situ polymerizations were carried out with selected monomers. The results are summarized in Table I.

TABLE I

Permeability Contrast Corrections in Berea Sandstone Cores by In-Situ Polymerizations

| Reference | Run No. | Run Type | Monomer Mix % By Wt. | | | Initiator | PV of SNSW[i] | Resistance Factor | Permeability (md) |
|---|---|---|---|---|---|---|---|---|---|
| | | | DAAm[d] | VP[e] | Am[f] | | | | |
| 30655-7 | 1[a] | Inv. | 100 | 0 | 0 | AIBN[g] ACVA[h] | 23.5 | 1.0 | 573# |

TABLE I-continued

Permeability Contrast Corrections in Berea Sandstone Cores by In-Situ Polymerizations

| Reference | Run No. | Run Type | Monomer Mix % By Wt. DAAm[d] | VP[e] | Am[f] | Initiator | PV of SNSW[i] | Resistance Factor | Permeability (md) |
|---|---|---|---|---|---|---|---|---|---|
|  |  |  |  |  |  |  | 0.3 | 507 | 1 |
|  |  |  |  |  |  |  | 1.1 | 560[j] | 1[k] |
| 30655-22,23 | 2[b] | Control | 0 | 50 | 50 | AIBN | 11.3 | 1.0 | 538# |
|  |  |  |  |  |  | ACVA |  |  |  |
|  |  |  |  |  |  |  | <0.4 | 230 | 2 |
|  |  |  |  |  |  |  | 1.4 | 27 | 20 |
|  |  |  |  |  |  |  | 8.7 | 5.0 | 108 |
|  |  |  |  |  |  |  | 30 | 3.4 | 157 |
| 30655-25 | 3[c] | Control | 0 | 50 | 50 | AIBN | 3.6 | 1.0 | 134# |
|  |  |  |  |  |  | ACVA | <0.4 | 25 | 5 |
|  |  |  |  |  |  |  | 0.4 | 9 | 15 |
|  |  |  |  |  |  |  | 0.9 | 4.4 | 30 |
|  |  |  |  |  |  |  | 6.7 | 2.7 | 49 |

These numbers represent core permeabilities before the in-situ polymerization treatment.
[a]A 10 weight percent solution of diacetone acrylamide (DAAm), 0.5 phm AIBN (2,2'-azobisisobutyronitrile) and 2.4 phm ACVA [4,4'-azobis(4-cyanovaleric acid)] in SNSW was injected into a Berea sandstone core.
[b]A solution containing 2.5 weight percent acrylamide (Am), 2.5 weight percent N—vinyl-2-pyrrolidone (VP), 0.5 phm AIBN and 1.2 phm ACVA in SNSW was injected into a Berea sandstone core.
[c]A solution containing 2.5 weight percent Am, 2.5 weight percent VP, 0.5 phm AIBN and 1.2 phm ACVA in SNSW was injected into a Berea sandstone core. This core contained waterflood residual oil.
[d]DAAm represents diacetone acrylamide.
[e]VP represents N—vinyl-2-pyrrolidone.
[f]Am represents acrylamide.
[g]AIBN represents 2,2'-azobis(isobutyronitrile).
[h]ACVA represents 4,4'-azobis(4-cyanovaleric acid).
[i]"PV of SNSW" represents "pore volumes of synthetic North Sea water".
[j]Resistance Factor reflects the ratio of mobilities of the injected SNSW before and after the in-situ polymerization, i.e., the "resistance" to fluid flow after in-situ polymerization was about 560 times as great as the resistance to fluid flow before the in-situ polymerization.
[k]The permeability of the core before the in-situ polymerization was 573 millidarcies and was decreased to one millidarcy after the treatment.

Referring to runs 1, 2 and 3, it is evident that the immediate effect of the monomer slug injection was to decrease the core permeability resulting in the genesis of significant resistance factors. It is noteworthy that this initial effect was greater in inventive run 1 because the homopolymer of diacetone acrylamide is water in-soluble compared to the 50/50 wt/wt VP/Am copolymer of control runs 2 and 3.

The continued passage of SNSW through the cores after the in-situ polymerization further demonstrates the persistent effect of the insoluble polymer generated in run 1. After the passage of 1.1 pore volumes of SNSW following the in-situ polymerization treatment of run 1, the resistance factor was 560 and the permeability was 1. At comparable stages in runs 2 and 3, respectively, 1.4 pore volumes and 0.9 pore volumes of SNSW following the in-situ polymerization treatment, the resistance factors were 27 and 9 whereas the permeabilities were 20 and 30. These data indicate that the longer lasting effect noted in run 1 can be attributed to the genesis of an in-soluble polymer in the Berea sandstone core. Continued passage of SNSW in control runs 2 and 3 resulted in lower resistance factors and higher permeabilities as expected with the water soluble VP/Am copolymer.

Since copolymers of diacetone acrylamide (DAAm) with VP or Am containing in the range of 40 to 95 weight percent DAAm are water insoluble, it is contemplated that copolymers of DAAm/VP and DAAm/Am can be advantageously used in the instant process. Representative copolymers of DAAm and Am exhibit a tendency to swell and therefore are presently preferred in the instant permeability contrast correction process. Suitable water-soluble comonomers to be used in conjunction with DAAm include VP, Am, sodium 2-acrylamido-2-methylpropanesulfonate (NaAMPS) and acrylonitrile (An) wherein the designation water soluble comonomer indicates that said comonomers exhibit solubilities of 5 or more grams of comonomer per 100 mL of water at 20° C.

That which is claimed is:

1. A method for permeability contrast correction operations involving in-situ polymerizaion to form water-insoluble polymers in remote subterranean areas which comprises
   (1) injecting into high permeability subterranean strata an aqueous solution containing water-soluble monomers comprising a major amount up to 100 weight percent of at least one N-3-oxohydrocarbon-substituted acrylamide and the balance being at least one other monomer selected from alpha,-beta-unsaturated amides, alpha,beta-unsaturated nitriles, vinyl-containing sulfonates and N-vinyl amides, and
   (2) polymerizing said monomer(s) in the presence of a free radical polymerization initiator to form water-insoluble polymers in-situ.

2. A process according to claim 1 wherein the initiator is introduced into the formation subsequent to the injection of water soluble monomers.

3. A process according to claim 1 wherein the polymerization initiator is introduced into the formation along with the monomers in an aqueous solution.

4. A process according to claim 1 wherein the aqueous solution is a brine.

5. A process according to claim 1 wherein the N-3-oxohydrocarbon-substituted acrylamide is diacetone acrylamide which is polymerized to form a water insoluble homopolymer.

6. A processs according to claim 1 wherein a water insoluble copolymer is formed from diacetone acrylamide and at least one of acrylamide and N-vinyl-2-pyrrolidone.

7. A process according to claim 1 wherein said N-3-oxohydrosubstituted acrylamides have the structural formula

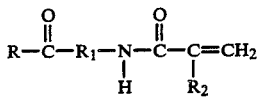

wherein R and $R_2$ are each selected from the class consisting of hydrogen and lower alkyl radicals containing 1 to 6 carbon atoms and $R_1$ is selected from the class consisting of ethylene and lower alkyl-substituted ethylene radicals with the proviso that said N-3-oxohydrocarbon-substituted acrylamides contain 6 to 14 carbon atoms.

8. A process according to claim 7 wherein said N-3-oxohydrocarbon-substituted acrylamide is polymerized with a comonomer selected from at least one N-vinyl amide having the formula

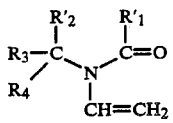

wherein $R'_2$, $R_3$ and $R_4$ are selected independently from the group consisting of hydrogen and methyl and $R'_1$ is selected from $C_1$ to $C_3$ alkyl groups and the groups $R'_2$ and $R'_1$ can collectively represent linear or branched divalent alkylene groups containing 2 to 4 carbon atoms.

9. A process according to claim 7 wherein said substituted acrylamide is copolymerized with alpha,beta-unsaturated amides having the formula

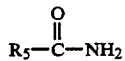

wherein $R_5$ is a 1-alkenyl radical selected from the group ethenyl(vinyl), propenyl, isopropenyl, 1-butenyl, 2-methyl-1-propenyl, 1-pentyl, 3-methyl-1-butenyl and 1-methyl-1-butenyl.

10. A process according to claim 1 wherein the polymerization initiator is a chemical free radical initiator.

11. A process according to claim 10 wherein the chemical initiator is selected from organic azo compounds, organic peroxides or redox systems.

12. A process according to claim 11 wherein the initiator is one of 2,2'-azobis(isobutyronitrile), 4,4'-azobis(4-cyanovaleric acid), 2,2'-azobis(2-amidinopropane)dihydrochloride, and 2,2'-azobis(N,N'-dimethyleneisobutyramidine)dihydrochloride.

13. A process according to claim 1 for the production of a homopolymer of said N-3-oxohydrocarbon-substituted acrylamide by polymerizing same in the presence of one of organic azo compounds, organic peroxides or redox systems in an aqueous saline solution.

14. A process according to claim 1 wherein the polymerizing medium comprises at least one alkali metal salt electrolyte and at least one alkaline earth metal electrolyte.

15. A method of decreasing the permeability of a permeable zone in a subterranean formation which comprises introducing into said permeable zone:
(a) an aqueous solution containing water-soluble monomers selected from
 (1) diacetone acrylamide, and
 (2) about 40 to about 95 weight percent diacetone acrylamide, and the remainder one other water-soluble monomer selected from alpha,beta-unsaturated amides, alpha,beta-unsaturated nitriles, vinyl-containing sulfonates and N-vinylamides, and
(b) an effective amount of a free radical initiator to polymerize and solidify the aqueous mixture therein and decrease the permeability of the formation.

16. A process according to claim 15 wherein a homopolymer of diacetone acrylamide is formed in said permeable area.

17. A process according to claim 15 wherein a copolymer of diacetone acrylamide and at least one of acrylamide and N-vinyl-2-pyrrolidone is formed in said permeable area.

18. A process according to claim 15 wherein said aqueous solution is a brine.

* * * * *